(12) United States Patent
Mayville et al.

(10) Patent No.: US 8,820,784 B1
(45) Date of Patent: Sep. 2, 2014

(54) GAS DEFLECTOR FOR GAS GENERATING SYSTEM

(75) Inventors: Brian A. Mayville, Troy, MI (US); Dale E. Tauchen, Clinton Township, MI (US)

(73) Assignee: TK Holdings Inc., Armada, MI (US)

( * ) Notice: Subject to any disclaimer, the term of this patent is extended or adjusted under 35 U.S.C. 154(b) by 28 days.

(21) Appl. No.: 13/243,554

(22) Filed: Sep. 23, 2011

Related U.S. Application Data (60) Provisional application No. 61/385,763, filed on Sep. 23, 2010.

(51) Int. Cl.
*B60R 21/26* (2011.01)

(52) U.S. Cl.
USPC .................. 280/742; 280/736; 280/740

(58) Field of Classification Search
CPC ............ B60R 21/26; B60R 2021/26094; B60R 21/261
USPC ................. 280/736, 740, 741, 742
See application file for complete search history.

(56) References Cited

U.S. PATENT DOCUMENTS

| | | | | |
|---|---|---|---|---|
| 3,414,282 A | * | 12/1968 | Salomon | 280/637 |
| 3,602,526 A | * | 8/1971 | Brawn | 280/740 |
| 4,178,017 A | * | 12/1979 | Ishi et al. | 280/740 |
| 4,944,527 A | * | 7/1990 | Bishop et al. | 280/741 |
| 5,149,130 A | * | 9/1992 | Wooley et al. | 280/743.1 |
| 5,803,486 A | * | 9/1998 | Spencer et al. | 280/728.2 |
| 6,419,266 B1 | * | 7/2002 | Morfouace et al. | 280/740 |
| 6,802,526 B2 | | 10/2004 | Dumbrique et al. | 280/728.2 |
| 6,846,013 B2 | * | 1/2005 | Smith | 280/740 |
| 6,890,001 B1 | * | 5/2005 | Smith | 280/736 |
| 7,370,884 B2 | * | 5/2008 | Clark et al. | 280/740 |
| 7,669,886 B2 | * | 3/2010 | Astrom | 280/729 |
| 7,708,798 B2 | * | 5/2010 | Krupp et al. | 55/525 |
| 7,748,739 B2 | | 7/2010 | Brinker | 280/742 |
| 7,874,575 B2 | * | 1/2011 | Fukuyama et al. | 280/728.2 |
| 8,100,433 B2 | * | 1/2012 | Shimono | 280/730.1 |
| 8,408,582 B2 | * | 4/2013 | Lunt et al. | 280/728.2 |
| 2002/0033590 A1 | * | 3/2002 | Adkisson | 280/728.3 |
| 2005/0156419 A1 | * | 7/2005 | Gabler et al. | 280/740 |
| 2008/0238059 A1 | * | 10/2008 | Astrom | 280/741 |
| 2011/0316263 A1 | | 12/2011 | Lunt et al. | 280/730.2 |

* cited by examiner

*Primary Examiner* — Ruth Ilan
(74) *Attorney, Agent, or Firm* — L.C. Begin & Associates, PLLC.

(57) ABSTRACT

A gas generating system is presented that contains a gas deflector positioned about an associated gas generator. The deflector may be attached to an outer wall of a perforate housing of the gas generator, or, alternatively, the deflector may be attached to a support structure positioned about the perforate housing, whereby gases exiting the gas generator upon actuation thereof, impinge upon the deflector.

14 Claims, 4 Drawing Sheets

GAS DEFLECTOR FOR GAS GENERATING SYSTEM

CROSS REFERENCE TO RELATED APPLICATIONS

This application claims the benefit of U.S. Provisional Application Ser. No. 61/385,763 having a filing date of Sep. 23, 2010.

TECHNICAL FIELD

The present invention relates to gas generating systems, and, to gas generators employed in vehicle occupant protection systems.

BACKGROUND OF THE INVENTION

The present invention relates to an improvement in gas generators that includes the ability to direct gas flowing from the gas generator.

Ongoing attempts to shield airbags or cushions from the detrimental effects of hot gas flowing from associated gas generator are known.

Various attempts to deflect gas flow exiting from a gas generator are known. Reasons for this include protecting associated protection devices from the onset of hot and forceful gases, such as airbag cushions and the like. For example, U.S. Pat. Nos. 6,149,192, 7,644,950, 6,595,547, 7,938,436, 7,597,351, and 7,654,566, the teachings of which are hereby incorporated by reference in their entirety, disclose inflators with a variety of deflectors. Each of these designs, with regard to the resultant flow of the gases exiting from the inflator, exhibit a relatively high-energy loss, with no ability to mitigate this loss. As a result, challenges remain when attempting to mitigate the high-temperature force that is inherent in the gas produced upon actuation of the gas generator. An improvement in this regard would be an advance in the art.

DETAILED DESCRIPTION

Figure 1:
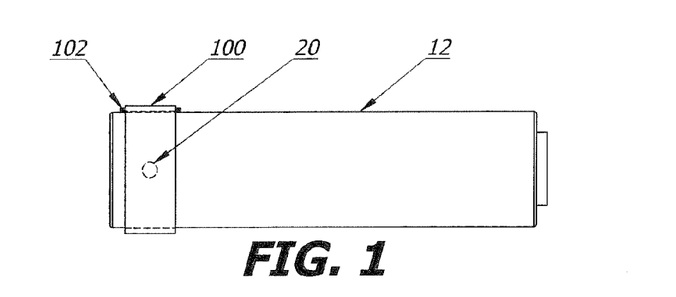
FIG. 1 is a side exterior view of a gas generating system incorporating a gas deflector in accordance with an embodiment of the present invention.
Figure 2:
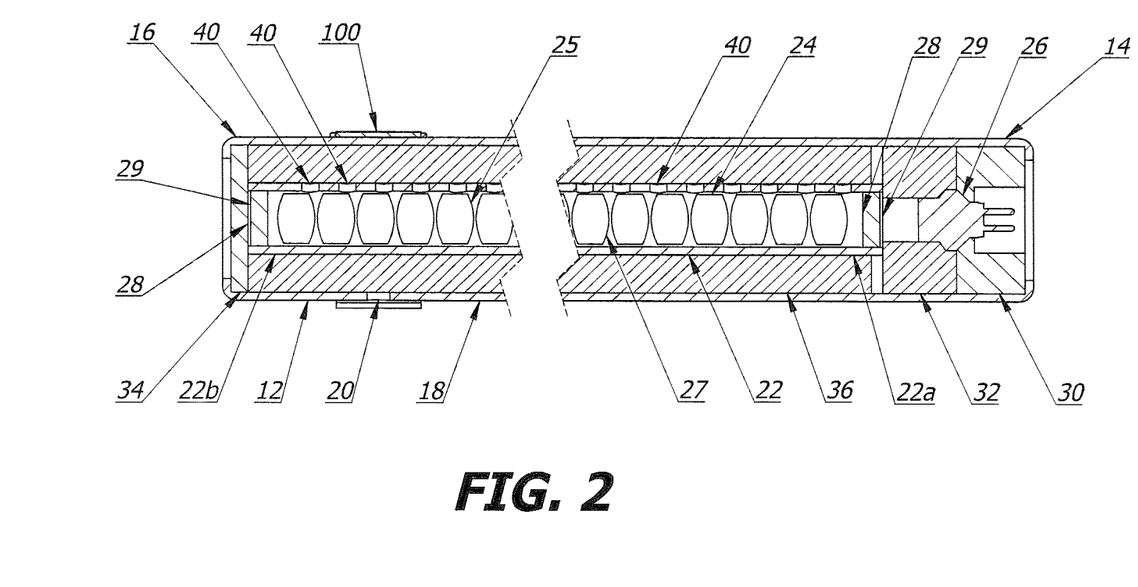
FIG. 2 is a cross-sectional side view showing the internal structure of the gas generating system of FIG. 1.
Figure 9:
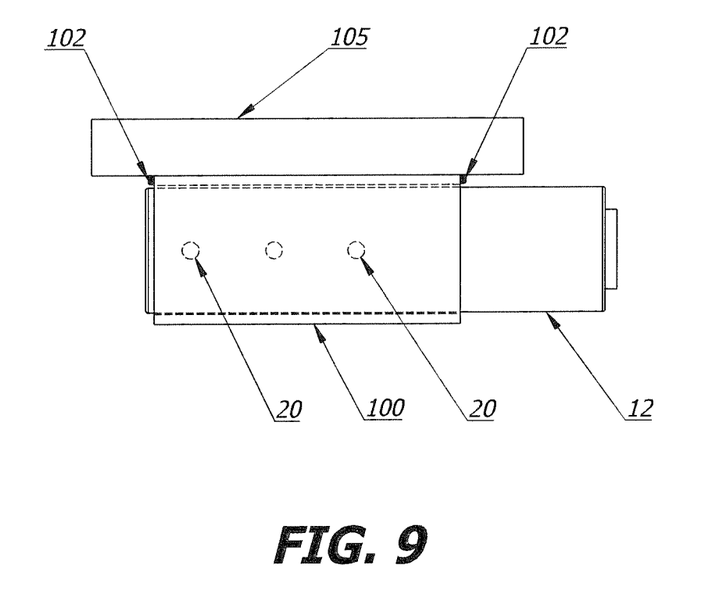
FIG. 9 is a side exterior view of a gas generating system incorporating a gas deflector mounted on a support structure, in accordance with an embodiment of the present invention.

FIGS. 1, 2, and 9 show views of an exemplary gas generating system 10 incorporating a gas deflector 100 positioned about the inflator 10 in accordance with a first embodiment of the present invention. Gas generating system or inflator 10 may constructed of components made from a durable metal such as carbon steel or iron, but may also include components made from tough and impact-resistant polymers, for example. One of ordinary skill in the art will appreciate various methods of construction for the various components of the gas generating system. U.S. Pat. Nos. 5,035,757, 6,422,601, 7,097,293, 7,654,565, 7,806,954, and 7,537,241 exemplify typical designs for the various gas generating system components, and are incorporated herein by reference in their entirety, but not by way of limitation.

In the embodiment shown in FIGS. 1 and 2, gas generating system 10 includes a tubular housing 12 having a pair of opposed ends 14, 16 and a housing wall 18 extending between the ends. Housing 12 may be cast, extruded, or otherwise metal-formed. A plurality of gas exit apertures 20 are formed along housing wall 18 to permit fluid communication between an interior of the housing and an airbag (not shown) or other inflatable device after ignition of a gas generant 24 (described below) positioned within housing 12. When forming the deflector, it is believed that the design criteria of the inflator, as related to a deflector described below, may be controlled thereby offering a tailorable feature with regard to airbag pressurization over time. Stated another way, the deflector offers a tunable approach to accommodating a designed actuated pressure of the airbag. The circumferential constraint of the deflector about the inflator housing may be designed to a greater or lesser extent as desired, and as needed for any particular airbag or other vehicle protective application.

In the embodiment shown in FIGS. 1 and 2, a longitudinal gas generant enclosure 22 is inwardly radially spaced from a wall of housing 12 and is coaxially oriented along a longitudinal axis of the housing. Enclosure 22 has an elongate, substantially cylindrical body defining a first end 22a, a second end 22b, and an interior cavity for containing gas generant material 24 therein. Enclosure first end 22a is configured to enable fluid communication between an igniter 26 and the enclosure interior cavity either before of after activation of the gas generating system. A plurality of gas exit apertures 40 is formed along enclosure 22 to enable fluid communication between the interior of the enclosure and an exterior of the enclosure after ignition of gas generant 24. Enclosure 22 may be formed from any suitable material, using any of a variety of suitable methods. For example, enclosure 22 may be roll-formed from sheet metal and then perforated to produce apertures 40. Enclosure apertures 40 may be environmentally sealed with an aluminum tape (not shown) or any other effective seal.

Referring again to FIG. 2, a plurality of gas generant tablets 24 is stacked side by side along a length of enclosure 22. In the embodiment shown, each tablet 24 has substantially the same dimensions. However, any of a variety of alternative arrangements and/or forms of gas generant may be provided, depending on the requirements of a particular application. Examples of gas generant compositions suitable for use in the present invention are disclosed in U.S. Pat. Nos. 5,035,757, 6,210, 505, and 5,872,329, incorporated herein by reference. However, the range of suitable gas generants is not limited to those described in the cited patents.

A quantity of a known auto-ignition material 28 is positioned proximate either end of the stack of gas generant material 24 so as to enable fluid communication between the auto-ignition material and the gas generant 24 before and/or after ignition of the auto-ignition material. Auto ignition material 28 is a pyrotechnic material which is ignited by exposure to a temperature lower than the ignition temperatures of both gas generant 24 and booster propellant (if any) (not shown in FIG. 2) used in the gas generating system. In the embodiment shown in FIGS. 1, and 2, auto-ignition material 28 is also positioned so as to be in thermal communication with housing 12 such that heat transfer between the housing and the auto-ignition material is enabled when a portion of the housing is exposed to elevated exterior temperatures. In the embodiment shown in FIGS. 1 and 2, auto-ignition material 28 is positioned so as to be in direct contact with housing.12. As is known in the art, auto-ignition material 28 is ignited by heat transmitted from an exterior of housing 12 to the interior of the housing due to an elevated external temperature condition (produced, for example, by a fire). Combustion of auto-ignition material 28 results in combustion of gas generant 24, either directly or through intervening combustion of a booster material (not shown). Suitable auto ignition materials are known to those skilled in the art. Examples of suitable auto-ignition materials are nitro-cellulose based compositions.

An igniter 26 is secured within gas generating system 10 such that actuation of the igniter initiates combustion of gas generant 24 in a manner known in the art, after activation of the gas generating system. In the embodiment shown, igniter 26 is positioned within an annular bore of an igniter closure 30. Igniter 26 may be formed as known in the art. One exemplary igniter construction is described in U.S. Pat. No. 6,009,809, herein incorporated by reference.

Igniter closure 30 is crimped or otherwise fixed to a first end 14 of housing 12. A first endcap 32 is coaxially juxtaposed adjacent igniter closure 30 to form, in conjunction with igniter closure 30, an inner housing for igniter 26. A second endcap 34 is crimped or otherwise fixed to a second end 16 of housing 12. Endcaps 32 and 34 and igniter closure 30 may be cast, stamped, extruded, or otherwise metal-formed. Alternatively, endcaps 32 and 34 may be molded from a suitable polymer.

A filter 36 may be incorporated into the gas generating system design for filtering particulates from gases generated by combustion of gas generant 24. In general, filter 36 is positioned between gas generant 24 and apertures 20 formed along gas generating system housing wall 18. In the embodiment shown in FIGS. 1 and 2, filter 36 is positioned exterior of gas generant enclosure 22 intermediate enclosure 22 and housing wall 18, and substantially occupies the annular space between gas generant enclosure 22 and housing wall 18. In an alternative embodiment (not shown), filter 36 is positioned in the interior cavity of enclosure 22 between gas generant 14 and enclosure gas exit apertures 40 formed along enclosure 22. The filter may be formed from any of a variety of materials (for example, a carbon fiber mesh or sheet) known in the art for filtering gas generant combustion products.

In the embodiment shown in FIGS. 1 and 2, gas deflector 100 is formed from one or more pieces 100a, 100b of relatively thin sheet metal material, or plastic material (for example, material suitable for use as shims) operatively coupled to the gas generating system housing 12 so as to enclose at least a portion of the housing. The use of relatively thin sheet metal minimizes the weight added to the overall gas generating system. The deflector may be welded, glued, or otherwise attached to the housing 12 or housing wall 18. Metal deflectors are preferred.

The gas deflector material 100 is coupled to the housing 12 and configured so as to permit outward deflection of the deflector responsive to forces exerted by gases G exiting the housing and impinging upon the deflector. Accordingly, the deflector 100 may be formed from a material that has a flexible, ductile, or otherwise malleable character to its composition, thereby facilitating the outward deflection upon gas generator actuation. Upon actuation of the gas generator 10, the deflected gases are directed into an interior of an associated airbag (not shown) coupled to the gas generating system, and in fluid communication therewith.

The portions 100a, 100b of the gas deflector 100 are also configured and positioned with respect to the housing gas exit openings 20 such that the gases streaming from the openings will impinge upon the deflector portions prior to contacting an airbag (not shown) coupled to the gas generating system. This helps prevent damage to the airbag material resulting from contact with hot gases flowing directly from the housing gas exit openings 20 to the airbag.

It is believed that the gas streams G exiting the openings 20 and impinging upon the deflector portions 100a, 100b may be cooled by transferring heat to the metallic or high-temperature polymeric deflector portions, for example. Accordingly, the deflector may be made of a material that effectively provides a heat sink for the gases exiting the housing 12 and yet still maintains its deflective properties. The portions of the gas deflector can be configured to maximize the deflector area available for heat transfer.

It is also believed that the gas streams G impinging upon the deflector portions 100a, 100b may be diffused or spread out by impacting the deflector portions and scattering to travel in various directions from the region of impact. It is also believed that the gases G may also be slowed by transferring energy to the deformable gas deflector portions 100a, 100b. These effects combine to help reduce the damage to airbag material resulting from a flow of hot gases from the housing gas exit orifices directly to a surface of the airbag material.

The deflector portions 100a, 100b may also be configured and coupled to the housing such that, when deflected by impinging gases, the deflector portions deform so as to direct the flow of gases along the deflector portions and from the deflector portions in one or more desired directions, for filling the associated airbag.

In one embodiment, the portions of the gas deflector are attached to housing 12 using a weld 102 or using any other suitable method.

In another embodiment shown in FIG. 9, the portions of the gas deflector are spaced apart from the housing and attached to another element of the structure to which the gas generating system is mounted. For example, the portions of the gas deflector may be secured to a portion of a vehicle frame, dashboard, or pillar of a vehicle. Stated another way, the deflector 100 may be generally attached to the gas generating system 10, to an outer wall 18 of the housing 12 or alternatively, to an outer or support structure 105 such as a module, for example. Again, as shown in FIG. 9, this embodiment provides a deflective surface for gases exiting the housing 12 that are deflectively shunted toward an airbag or cushion (not shown) in fluid communication with the gas generator, but yet simplifies the design of the inflator.

In yet another embodiment, and in the same way as described above, some portions of the gas deflector may be attached to the gas generating system housing while other portions of the gas deflector are attached to an element of the vehicle structure such as the module.

Figure 5:
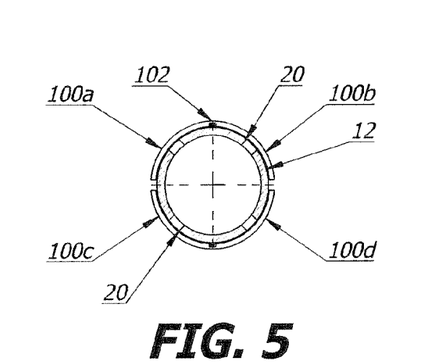
FIG. 5 is an end view of a gas generating system and gas deflector in accordance with another embodiment of the present invention, prior to activation of the system.
Figure 6:
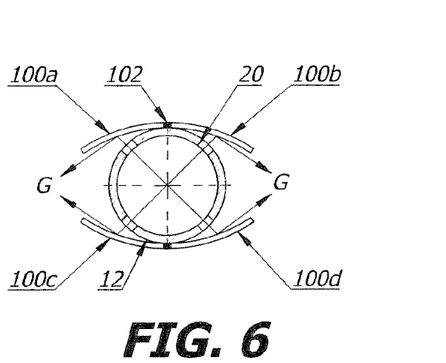
FIG. 6 is the end view of the gas generating system of FIG. 5, after to activation of the gas generating system.

Referring to FIGS. 5 and 6, in another embodiment, the gas deflector is formed from four portions 100a, 100b, 100c, and 100d. This embodiment illustrates how the structure of the gas deflector 100 can be positioned so as to conform to the circumferential distribution of gas exit apertures 20 along a wall of housing 12, to ensure that all gases exiting openings 20 will impinge upon some portion of the deflector, even when the various portions of the deflector are in deflected conditions.

In addition, parameters such as the overall dimensions of the deflector portions and the location(s) along the deflector portions at which they are attached to the housing or other element may be selected so as to control the lengths of the free or unsecured portions of the deflector. This enables control of the stiffness and deflectability of the free ends of the deflector portions responsive to the forces exerted by the gases, and control of the amount of deflector material available for heat transfer.

Also, parameters such as the base deflector material, thickness of the deflector material, the temper of the material, and other pertinent parameters may be selected so as to provide or contribute to the deflectability of the deflector portions and the ability of the deflector portions to absorb heat.

Figure 7:
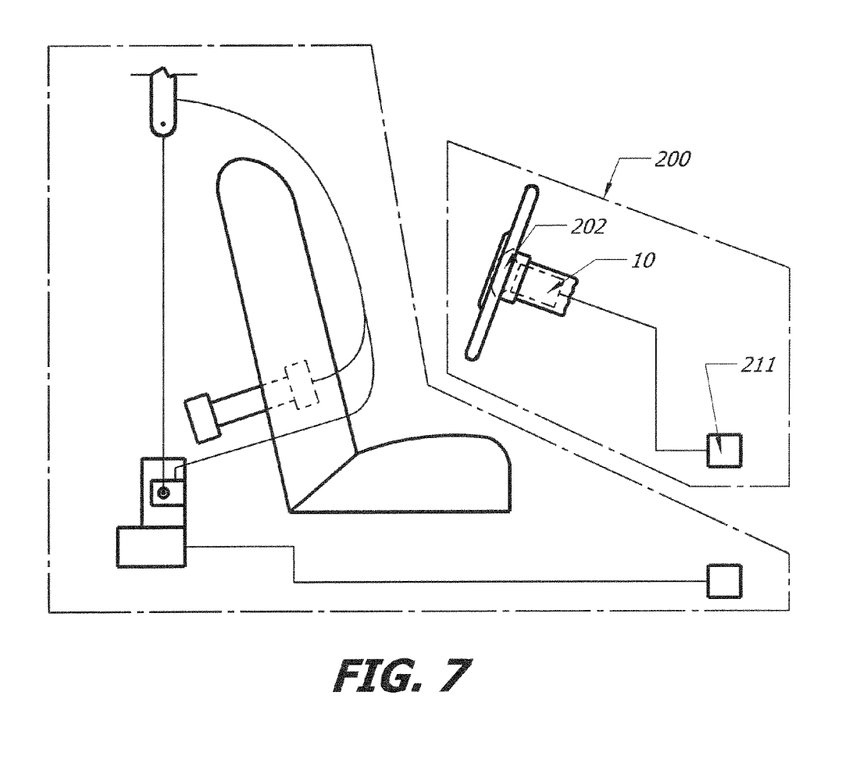
FIG. 7 is a schematic representation of an exemplary vehicle occupant protection system incorporating a gas generating system including a gas deflector in accordance with an embodiment of the present invention.
Figure 8:
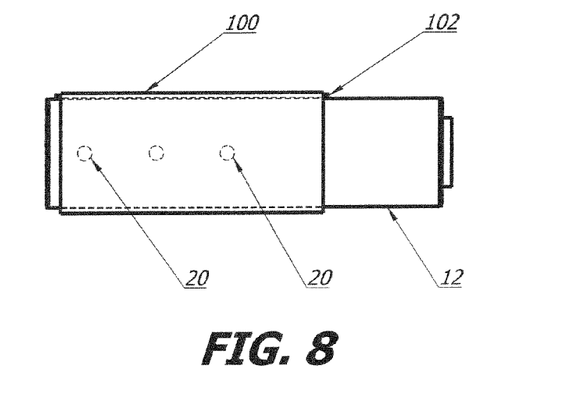
FIG. 8 is a side exterior view of a gas generating system incorporating a gas deflector in accordance with an embodiment of the present invention, the gas deflector covering a plurality of gas exit orifices.

Furthermore, the overall dimensions of the gas deflector may be adjusted to enable coverage of gas exit openings formed along any portion of the length of the housing. For example, as shown in FIG. 1, gas exit openings 20 are formed proximate an end of the housing. The dimensions of gas deflector 100 are tailored to ensure that gases exiting openings 20 impinge upon the deflector. In the embodiment shown in. FIG. 7, gas exit openings 20 are formed along a relatively greater length of the housing. The dimensions of gas deflector 100 are tailored accordingly to ensure that gases exiting openings 20 still impinge upon the deflector.

In operation, as the gas G impinges on and flows along the deflector portions, the gas may be cooled to a certain degree by heat transfer to the metallic, high-temperature plastic, or heat-retaining flow deflector. In this manner, the flow deflector functions as a heat shield which aids in preventing thermal damage to the airbag material.

Figure 3:
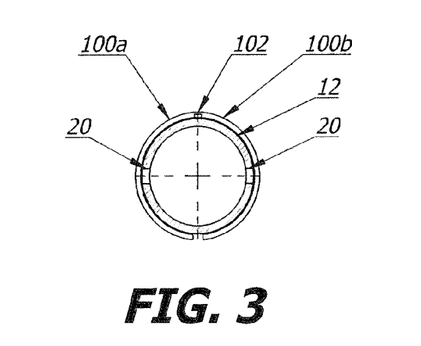
FIG. 3 is an end view of the gas generating system of FIGS. 1 and 2, prior to activation of the gas generating system.
Figure 4:
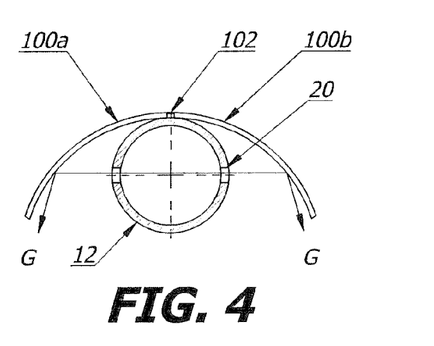
FIG. 4 is the end view of the gas generating system of FIG. 3, after to activation of the gas generating system.

In yet another advantage of the present invention, and as shown in FIGS. 3 and 4, the deflector 100 may be wrapped around the housing 12 prior to actuation of the inflator 10. The residual stresses imparted to the deflector may be controlled during fabrication to vary the amount of force with which the deflector 100 grips the housing 12. It is believed that this correspondingly affects the amount of force exerted by gas exiting the housing 12 thereby deforming the deflector 100 as shown in FIG. 4. The gas pressure at which the deflector will be deformed and/or the amount of deformation resulting from a given gas pressure can be tailored to the respective application, based on metal content and/or based on thickness of the deflector, for example.

Tank pressure data for an inflator containing a deflector resulting in radial flow of gases exiting from the inflator 10, in accordance with the present invention, indicated a maximum pressure of about 20 to 21 kPa at about 0.057 seconds after gas generator actuation. In contrast, tank pressure data for inflators designed as described in U.S. Pat. Nos. 7,938,436 and 7,597,351, exhibiting an axial flow of gases exiting the inflator and a resultant reduced energy, indicated a maximum pressure of about 8.8 kPa at about 0.052 seconds after gas generator actuation. The result is that the present inflators exhibiting radial gaseous flow upon actuation of the gas generator exhibit a substantial increase in energy for use in protective devices such as an airbag, while yet mitigating the heat or force directly impacting the airbag cushion, for example.

In yet further testing, tank pressure data for an inflator containing a deflector resulting in radial flow of gases exiting from the inflator 10, in accordance with the present invention, indicated a maximum pressure of about 20 to 20.5 kPa at about 0.045 seconds after gas generator actuation. In contrast, tank pressure data for inflators designed with typical metal diffusers, indicated a maximum pressure of about 8.8 to 8.9 kPa at about 0.051 seconds after gas generator actuation. The result is that the present inflators exhibit a substantial relative increase in energy for use in protective devices such as an airbag, while yet mitigating the heat or force directly impacting the airbag cushion, for example.

Referring now to FIG. 7, a gas generating system in accordance with one of the embodiments described herein may be incorporated into a vehicle occupant protection system 200. Vehicle occupant protection system 200 includes at least one airbag 202 and a gas generating system 10 in accordance with the present invention and coupled to airbag 202 so as to enable fluid communication with an interior of the airbag. Vehicle occupant protection system 200 may be in operative communication with a crash event sensor 211 which communicates with a known crash sensor algorithm that signals actuation of vehicle occupant restraint system 200 via, for example, activation of airbag gas generating system 10 in the event of a collision.

Although the embodiments of the present invention are described herein with reference to a gas generating system having a cylindrically-shaped housing, it will be understood that embodiments of the thermal barrier described herein can be applied to any of a wide variety of alternative housing shapes and configurations. For example, embodiments of the gas deflector described herein may be applied to gas generating systems having housing formed from a base and cap, rather than a cylindrical tube. Embodiments of the gas deflector described herein may be also applied to gas generating systems having multiple combustion chambers. Application of embodiments of the gas deflector to numerous other types and structures of gas generating systems is also contemplated.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A gas generating system comprising:
    a cylindrical housing having at least a first and a second gas exit orifices formed therealong;
        a first deflector portion attached directly to an exterior of the housing at a first attachment location angularly spaced apart from a location of the first gas exit orifice, so as to cover the first gas exit orifice, the first deflector portion having a first free end angularly spaced apart from the first attachment location and in direct contact with the housing prior to activation of the gas generating system; and
        a second deflector portion attached directly to an exterior of the housing at a second attachment location angularly spaced apart from a location of the second gas exit orifice and also from the first attachment location, so as to cover the second gas exit orifice, the second deflector portion having a second free end angularly spaced apart from the second attachment location and in direct contact with the housing prior to activation of the gas generating system, the second free end being angularly spaced apart from the first free end so as to define a first gap between the first and second deflector portions at the first and second free ends, the first and second deflector portions being structured so that the free ends of the each of the first and second deflector portions deflect in a direction away from the housing responsive to gases exiting the housing and impinging upon the deflector portions.

2. The gas generating system of claim 1 wherein the first and second deflector portions are structured to deflect responsive to gases exiting the housing and impinging upon the deflector portions, such that a width of the gap during impingement of the gases on the deflector portions is proportional to a pressure exerted by the gases on the deflector portions.

3. The gas generating system of claim 1 wherein said first attachment location is angularly spaced apart along an exterior of the housing 90 degrees or less from the location of the first gas exit orifice.

4. The gas generating system of claim 3 wherein the first attachment location is angularly spaced apart 90 degrees or less from the location of the second gas exit orifice.

5. The gas generating system of claim 1 wherein said first deflector portion is curved so as to contact an exterior surface of the housing between the first attachment location and the first free end, and wherein a radius of curvature of the first deflector portion resides on a plane perpendicular to a longitudinal axis of the housing.

6. The gas generating system of claim 5 wherein the second deflector portion is curved so as to contact an exterior surface of the housing between the second attachment location and the second free end, and wherein a radius of curvature of the second deflector portion resides on a plane perpendicular to a longitudinal axis of the housing.

7. A vehicle occupant protection system including a gas generating system in accordance with claim 1.

8. A gas generating system comprising:
a cylindrical housing having at least first, second, third, and fourth gas exit orifices formed therealong;
a first deflector portion attached directly to an exterior of the housing at a first attachment location angularly spaced apart from a location of the first gas exit orifice, so as to cover the first gas exit orifice, the first deflector portion having a first free end angularly spaced apart from the first attachment location and in direct contact with the housing prior to activation of the gas generating system; and
a second deflector portion attached directly to an exterior of the housing at a second attachment location angularly spaced apart from a location of the second gas exit orifice, so as to cover the second gas exit orifice, the second deflector portion having a second free end angularly spaced apart from the second attachment location and in direct contact with the housing prior to activation of the gas generating system,
the second free end being angularly spaced apart from the first free end so as to define a first gap between the first and second deflector portions at the first and second free ends,
a third deflector portion attached directly to an exterior of the housing at the first attachment location so as to cover the third gas exit orifice, the third gas exit orifice angularly spaced apart from the first attachment location, the third deflector portion having a third free end angularly spaced apart from the first attachment location and in direct contact with the housing prior to activation of the gas generating system; and
a fourth deflector portion attached directly to an exterior of the housing at the second attachment location so as to cover the fourth gas exit orifice, the fourth gas exit orifice being angularly spaced apart from the second attachment location, the fourth deflector portion having a fourth free end angularly spaced apart from the second attachment location and in direct contact with the housing prior to activation of the gas generating system,
the fourth free end being angularly spaced apart from the third free end so as to define a second gap between the third and fourth deflector portions at the third and fourth free ends,
the first and second deflector portions being structured so that the free ends of each of the first and second deflector portions deflect in a direction away from the housing responsive to gases exiting the housing and impinging upon the deflector portions, and such that gases flowing off of the first deflector free end and through the first gap are urged in a first direction, and gases flowing off of the second deflector free end and through the first gap are urged in a second direction converging with the first direction, and
the third and fourth deflector portions being structured so that the free ends of each of the third and fourth deflector portions deflect in a direction away from the housing responsive to gases exiting the housing and impinging upon the deflector portions, and such that gases flowing off of the third deflector free end and through the second gap are urged in a third direction, and gases flowing off of the fourth deflector free end and through the second gap are urged in a fourth direction converging with the third direction.

9. The gas generating system of claim of claim 8 wherein the second gap is located on a side of the housing diametrically opposite the first gap.

10. A vehicle occupant protection system including a gas generating system in accordance with claim 8.

11. A gas generating system comprising:
a cylindrical housing having a plurality gas exit orifices formed therealong; and
a first deflector portion attached directly to an exterior of the housing at a first attachment location angularly spaced apart from the gas exit orifices, so as to cover the first gas exit orifice, the first deflector portion having a first free end angularly spaced apart from the first attachment location and in direct contact with the housing prior to activation of the gas generating system;
a second deflector portion attached directly to an exterior of the housing at a second attachment location angularly spaced apart from the gas exit orifices and also from the first attachment location, so as to cover the second gas exit orifice, the second deflector portion having a second free end angularly spaced apart from the second attachment location and in direct contact with the housing prior to activation of the gas generating system,
the second free end being angularly spaced apart from the first free end so as to define a first gap between the first and second deflector portions at the first and second free ends such that gases exiting the housing and impinging upon the first and second deflector portions are directed through the first gap;
a third deflector portion attached directly to an exterior of the housing at the first attachment location so as to cover a third gas exit orifice, the third deflector portion having a third free end angularly spaced apart from the first attachment location and in direct contact with the housing prior to activation of the gas generating system; and a fourth deflector portion attached directly to an exterior of the housing at the second attachment location so as to cover a fourth gas exit orifice, the fourth deflector portion having a fourth free end angularly spaced apart from the second attachment location and in direct contact with the housing prior to activation of the gas generating system, the fourth free end being angularly spaced apart from the third free end so as to define a second gap between the third and fourth deflector portions at the third and fourth free ends, such that gases exiting the housing and impinging upon the third and fourth deflector portions are directed through the second gap.

12. The gas generating system of claim 11 wherein the second deflector portion is physically separate from the first deflector portion.

13. The gas generating system of claim 11 wherein the fourth deflector portion is physically separate from the third deflector portion.

14. A vehicle occupant protection system including a gas generating system in accordance with claim 11.

* * * * *

UNITED STATES PATENT AND TRADEMARK OFFICE
CERTIFICATE OF CORRECTION

PATENT NO. : 8,820,784 B1
APPLICATION NO. : 13/243554
DATED : September 2, 2014
INVENTOR(S) : Mayville et al.

It is certified that error appears in the above-identified patent and that said Letters Patent is hereby corrected as shown below:

In the Specification

Column 1; Line 54;   Please delete "to".

Column 1; Line 59;   Please delete "to".

Column 2; Line 11;   Please delete "may" and insert --maybe--.

Column 3; Line 19;   Please delete "." before the 12.

In the Claims

Column 8; Line 37; Claim 9;   Please delete the second occurrence of "of claim".

Signed and Sealed this
Eighteenth Day of November, 2014

Michelle K. Lee
*Deputy Director of the United States Patent and Trademark Office*